United States Patent [19]

Cyron

[11] Patent Number: 4,885,269
[45] Date of Patent: Dec. 5, 1989

[54] METHOD OF OXIDATION OF THE SURFACE OF A CATALYST CARRIER BODY AND A CATALYST CARRIER BODY PRODUCED ACCORDING TO THE METHOD

[75] Inventor: Theodor Cyron, Bergisch Gladbach, Fed. Rep. of Germany

[73] Assignee: Emitec Gesellschaft fur Emissionstechnologie mbH, Lohmar, Fed. Rep. of Germany

[21] Appl. No.: 168,671

[22] Filed: Mar. 16, 1988

[30] Foreign Application Priority Data

Mar. 16, 1987 [DE] Fed. Rep. of Germany ....... 3708515

[51] Int. Cl.$^4$ .............................................. B01J 32/00
[52] U.S. Cl. ................................................... 502/439
[58] Field of Search ......................................... 502/439

[56] References Cited

U.S. PATENT DOCUMENTS 3,944,504  3/1976  Ford et al. ...................... 252/455 R
3,969,082  7/1976  Cairns et al. .................... 23/288 FC
4,247,422  1/1981  Davies ................................. 252/465

FOREIGN PATENT DOCUMENTS 2422851  3/1986  Fed. Rep. of Germany .
1584370 12/1969  France .

Primary Examiner—W. J. Shine
Attorney, Agent, or Firm—Herbert L. Lerner; Laurence A. Greenberg

[57] ABSTRACT

A method for oxidation of the surface of a catalyst carrier body made from an aluminum-containing iron alloy and a catalyst carrier body produced according to the method, includes oxidizing the surface of the catalyst carrier body made from an aluminum-containing iron alloy with the exclusion of nitrogen. A film formed substantially of aluminum oxide is developed on the surface of the catalyst carrier body. Preferably, the step of oxidizing the surface of the catalyst carrier body is performed at an elevated temperature, such as above 900° C.

11 Claims, No Drawings

METHOD OF OXIDATION OF THE SURFACE OF A CATALYST CARRIER BODY AND A CATALYST CARRIER BODY PRODUCED ACCORDING TO THE METHOD

SPECIFICATION

The invention relates to a method for the oxidation of the surface of a catalyst carrier body made from an aluminum-containing iron alloy to substantially form aluminum oxide.

German patent DE-PS No. 24 22 851 discloses an oxidation method of this kind. Examples of suitable iron alloys and the further treatment thereof in producing a catalyst are also described in that patent.

According to the prior art, the oxidation of such catalyst carrier bodies takes place in air and a film or layer of aluminum oxide forms on the surface of the iron alloys. However, extended surfaces of the metal matrix bodies for catalysts often have narrow channels with a low ratio of cross section to length. It has been found that in particular in the oxidation of the inner surfaces of such narrow channels, the presence of the nitrogen contained in the air hinders the development of a sealed anti-corrosion surface film or layer of aluminum oxide. The development of a sealed anti-corrosion surface film or layer of aluminum oxide is hindered because the nitrogen in the air, which is depleted of oxygen by the oxidation process, reacts with the aluminum on the surface of an aluminum-containing iron alloy or iron-chrome alloy, forming aluminum nitride. The aluminum nitride embedded in the protective aluminum oxide film or layer on the metal surface is not temperature-stable, and at the high thermal operating loads of the metal catalyst carrier body it leads to the destruction of the protective film or layer and to damage of the underlying metal material from internal corrosion.

It is accordingly an object of the invention to provide a method of oxidation of the surface of a catalyst carrier body and a catalyst carrier body produced according to the method, which overcomes the hereinafore-mentioned disadvantages of the heretofore-known methods and devices of this general type and which leads to closed and thermally stable aluminum oxide protective films or layers.

With the foregoing and other objects in view there is provided, in accordance with the invention, a method for oxidation of the surface of a catalyst carrier body made from an aluminum-containing iron alloy, which comprises oxidizing the surface of the catalyst carrier body made from an aluminum-containing iron alloy with the exclusion of nitrogen and nitrides, and forming a film substantially of aluminum oxide on the surface of the catalyst carrier body. Preferably, the step of oxidizing the surface of the catalyst carrier body is performed by oxygen at an elevated temperature, such as above 900° C.

Due to the exclusion of nitrogen during the oxidation of the surface, problematic nitrides cannot form.

In accordance with another mode of the invention, there is provided a method which comprises performing the step of oxidizing the surface of the catalyst carrier body at a partial oxygen pressure approximately equivelent to that of air.

In accordance with a further mode of the invention, there is provided a method which comprises performing the step of oxidizing the surface of the catalyst carrier body in an atmosphere substantially formed of oxygen at reduced pressure, such as 10 to 300 mbar.

In accordance with an added mode of the invention, there is provided a method which comprises performing the step of oxidizing the surface of the catalyst carrier body in a mixture of oxygen and at least one noble gas selected from the members of the zero group of the periodic system.

In accordance with an additional mode of the invention, there is provided a method which comprises brazing the catalyst carrier body, and performing the step of oxidizing the surface of the catalyst carrier body during cooling of the catalyst carrier body after the brazing step or performing the step of oxidizing the surface of the catalyst carrier body during a heat treatment.

With the objects of the invention in view, there is provided a catalyst carrier body, comprising a portion formed of an aluminum-containing iron alloy having a surface, and a film disposed on the surface being formed substantially of aluminum oxide with no or very few nitride components.

The term noble gas as used herein refers to members of the zero group of the periodic system: He, Ne, A, Kr, Xe, Rn.

Other features which are considered as characteristic for the invention are set forth in the appended claims.

Although the invention is illustrated and described herein as embodied in a method of oxidation of the surface of a catalyst carrier body and a catalyst carrier body produced according to the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments.

Referring now to the method steps according to the invention in detail, the gaseous oxidation of the surface of a catalyst carrier body made from an aluminum-containing iron alloy, is performed by oxidizing the surface of the catalyst carrier body with the exclusion of nitrogen, and forming a film or layer substantially of aluminum oxide on the surface of the catalyst carrier body. The oxidation is preferably performed at elevated temperatures, such as higher than 900° C.

Care should also be taken to ensure that the oxidation is not performed overly quickly, because the oxide surfaces that form could then flake off. It is therefore proposed that either the oxidation be performed in a pure oxygen atmosphere at a reduced pressure of approximately 10 to 300 mbar, for instance, or that a mixture of oxygen and noble gases be used, in which the oxygen partial pressure can be kept correspondingly low. In the oxidation of honeycomb bodies having small cell diameters and long channels, the use of a pure oxygen atmosphere has the advantage of permitting a very uniform oxide film or layer to be formed without requiring additional convection into the individual cells. When using oxygen mixtures or when performing the oxidation in air known from the prior art, the oxygen component in the cells may be consumed completely, with additional oxygen being incapable of diffusing-in quickly enough from the outside. This leads to a non-uniform oxide film or layer on the metal surface, with less protection of the underlying material from corrosion at high thermal loads. If pure oxygen is used, this problem cannot arise, because the oxygen consumed for oxidation is immediately replaced with oxygen flowing in behind it.

Naturally it is particularly economical to combine the oxidation according to the invention with a brazing process or heat treatment which is necessary in any case.

A corresponding product can, for example, be produced by the method according to the invention. This product is distinguished by the feature that the oxide film or layer on the surface of the catalyst carrier body contains either very few nitride components or none at all. Furthermore, the conventional production methods for catalyst carrier bodies and the catalytically active coatings do not need to be modified.

I claim:

1. A method for oxidation of the surface of a catalyst carrier body made from an aluminum-containing iron alloy, which comprises the step of oxidizing the surface of said catalyst carrier body in an oxygen-containing atmosphere with the exclusion of nitrogen, and forming a film of aluminum oxide substantially free of nitrides on the surface of said catalyst carrier body.

2. A method according to claim 1, which comprises performing the step of oxidizing the surface of the catalyst carrier body at an elevated temperature.

3. A method according to claim 1, which comprises performing the step of oxidizing the surface of the catalyst carrier body at an elevated temperature above 900° C.

4. A method according to claim 1, which comprises performing the step of oxidizing the surface of the catalyst carrier body at a partial oxygen pressure approximately equivalent to that of air.

5. A method according to claim 1, wherein comprises performing the step of oxidizing the surface of the catalyst carrier body in an atmosphere substantially formed of oxygen at reduced pressure.

6. A method according to claim 1, which comprises performing the step of oxidizing the surface of the catalyst carrier body in an atmosphere substantially formed of oxygen at reduced pressure of 10 to 300 mbar.

7. A method according to claim 1, which comprises performing the step of oxidizing the surface of the catalyst carrier body in a mixture of oxygen and at least one noble gas.

8. The method according to claim 4, which comprises performing the step of oxidizing the surface of the catalyst carrier body in a mixture of oxygen at a partial pressure of 10 to 300 mbar and the balance at least one noble gas.

9. A method according to claim 1, which comprises the steps of brazing the catalyst carrier body, and then performing the step of oxidizing the surface of the catalyst carrier body during the cooling of the catalyst carrier body after the brazing step.

10. A method according to claim 1, which comprises performing the step of oxidizing the surface of the catalyst carrier body during a heat treatment.

11. A catalyst carrier body, comprising a portion formed of an aluminum-containing iron alloy having an extended surface, and an aluminum film disposed on said surface formed substantially of aluminum oxide, substantially free from nitride components.

* * * * *